United States Patent
Yokohata

(10) Patent No.: US 6,943,969 B2
(45) Date of Patent: Sep. 13, 2005

(54) METHOD OF DETECTING PROTRUSION ON RECORDING MEDIUM AND DETECTING APPARATUS THEREFOR

(75) Inventor: Toru Yokohata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 26 days.

(21) Appl. No.: 10/662,767

(22) Filed: Sep. 15, 2003

(65) Prior Publication Data

US 2004/0075924 A1 Apr. 22, 2004

(30) Foreign Application Priority Data

Sep. 20, 2002 (JP) ..................................... 2002-275778

(51) Int. Cl.$^7$ ............................................... G11B 5/02
(52) U.S. Cl. ........................... 360/25; 360/75; 360/76; 360/39; 360/55; 360/77.01; 360/77.02
(58) Field of Search ............................. 360/75–76, 39, 360/55, 77.01, 77.02, 77.03, 25; 714/48, 25; 324/331, 345; 73/1.22, 1.41, 12.01

(56) References Cited

U.S. PATENT DOCUMENTS

| | | | | |
|---|---|---|---|---|
| 4,322,806 A | * | 3/1982 | Allison | ..................... 702/76 |
| 5,666,237 A | * | 9/1997 | Lewis | ..................... 360/75 |
| 5,870,241 A | * | 2/1999 | Ottesen et al. | ............ 360/77.02 |
| 6,140,814 A | * | 10/2000 | Sundaram | .................... 324/212 |
| 6,239,951 B1 | * | 5/2001 | Wang et al. | ............. 360/236.8 |

FOREIGN PATENT DOCUMENTS

| | | | |
|---|---|---|---|
| JP | 09-063050 | * | 3/1997 |
| JP | 9-063050 | | 3/1997 |
| JP | 11-110750 | * | 4/1999 |
| JP | 2002-022716 | | 1/2002 |

OTHER PUBLICATIONS

"Acoustic Snesor for Head/Disk Assembly", Aug. 1989, IBM Technical Disclosure Bulletin, vol. No. 32, Issue No. 3B, pp. 328–329.*

* cited by examiner

Primary Examiner—David Hudspeth
Assistant Examiner—Natalia Figueroa
(74) Attorney, Agent, or Firm—Greer, Burns & Crain, Ltd.

(57) ABSTRACT

An acoustic emission sensor is mounted on a flying slider opposed to a rotating recording medium, for example. The acoustic emission sensor outputs a detection signal in response to the sound of collision. When a protrusion exists on the recording medium, the flying slider is expected to collide against the protrusion at a predetermined fixed angular position. A variation is induced in the detection signal based on the collision between the flying slider and the protrusion in synchronization with the rotation of the recording medium. Specifically, when a variation is synchronized with the angular position signal of the recording medium, the variation should correspond to a protrusion existing on the surface of the recording medium. If the component corresponding to the variation is extracted out of the detection signal, a protrusion on the recording medium can be determined at a higher accuracy.

17 Claims, 2 Drawing Sheets

METHOD OF DETECTING PROTRUSION ON RECORDING MEDIUM AND DETECTING APPARATUS THEREFOR

BACKGROUND OF THE INVENTION

1. Field of the Invention

The present invention relates to a magnetic recording medium that can be incorporated within a magnetic storage apparatus such as a hard disk drive (HDD), for example. In particular, the invention relates to a method of detecting a minute protrusion existing on the surface of a magnetic recording medium.

2. Description of the Prior Art

Japanese Patent Application Publication No. 9-063050 discloses a conventional inspection apparatus capable of detecting protrusions existing on a magnetic recording disk. The inspection apparatus includes a flying slider opposed to the surface of a rotating magnetic recording disk. A piezoelectric element such as a PZT (lead zirconate titanate) element is mounted on the flying slider. When the flying slider collides against a protrusion on the surface of the magnetic recording disk, sound or an elastic wave is generated. The PZT element serves to convert the sound of the collision into an electric signal. A voltage signal is output from the PZT element. When the voltage signal exceeds a predetermined amplitude, a protrusion is detected.

A further improved recording density is expected in a hard disk drive, for example. The flying height of a head slider is required to get reduced. The head slider is forced to get closer to the surface of the magnetic recording disk. It is required to reduce the height of protrusions on the magnetic recording disk. The aforementioned predetermined amplitude or threshold level is required to get smaller so as to reduce the height of a protrusion to be detected in the inspection apparatus.

Noise is often included in the voltage signal output from the PZT element. If the noise exceeds a predetermined amplitude, the inspection apparatus may take it for the existence of a protrusion. A reduced threshold level may cause an increased probability of the misidentification for a protrusion.

SUMMARY OF THE INVENTION

It is accordingly an object of the present invention to provide a method of detecting a protrusion capable of determining a protrusion over the surface of a recording medium at a higher accuracy.

According to the present invention, there is provided a method of detecting a protrusion on a recording medium, comprising: obtaining an angular position signal specifying an angle of rotation of the recording medium from a standard attitude of the recording medium; obtaining a detection signal output from a collision detector designed to detect a collision between the surface of the recording medium and a flying slider; and determining a collision between the surface of the recording medium and the flying slider based on the angular position signal and the detection signal.

In general, when a protrusion exists on the surface of the recording medium, the flying slider is expected to collide against the protrusion at a predetermined fixed angular position. A variation is induced in the detection signal based on the collision between the flying slider and the protrusion in synchronization with the rotation of the recording medium. Specifically, when a variation is synchronized with the angular position signal or the rotation of the recording medium, such a variation should correspond to a protrusion existing on the surface of the recording medium. If the component corresponding to the variation is extracted out of the detection signal, a protrusion on the recording medium can be determined at a higher accuracy.

A constant relative speed is set between the specific surface of the recording medium and the flying slider opposed to the specific surface, during the rotation of the recording medium. In general, the flying slider is allowed to enjoy a lift based on the airflow generated along a rotating recording medium, so that the flying slider flies above the surface of the recording medium. The flying height of the flying slider depends upon the relative speed between the flying slider and the surface of the recording medium. If the relative speed is kept constant between the flying slider and the surface of the recording medium, the flying slider is allowed to keep a constant flying height above the surface of the recording medium. The flying slider of the type is reliably utilized to find a protrusion higher than the constant flying height of the flying slider. In this case, the relative speed of the recording medium may get reduced as the flying slider get distanced from the central axis or rotation axis of the recording medium.

The collision detector may be designed to detect a sound induced based on a collision between the surface of the recording medium and the flying slider. The collision detector of the type may include an acoustic emission (AE) sensor. The AE sensor may be mounted on the flying slider, for example. The AE sensor on the flying slider is expected to reliably pick up sound or elastic waves of collision between the flying slider and the surface of the recording medium. In this case, the AE sensor may comprise a piezoelectric element such as a PZT (lead zirconate titanate) element.

The aforementioned method may additionally comprise: obtaining an index signal specifying the standard attitude of the recording medium when the angular position signal is generated; and generating a sine wave signal based on a period of the index signal. The sine wave signal is expected to reliably reflect the angular position of the rotating recording medium at a higher accuracy irrespective of variation in the rotation speed of the recording medium. At the same time, the method may additionally comprise generating a cosine wave signal based on a period of the index signal. The cosine wave signal is likewise expected to reliably reflect the angular position of the rotating recording medium at a higher accuracy irrespective of variation in the rotation speed of the recording medium.

Furthermore, the method may additionally comprise: generating a first reference signal specifying the product of the sine wave signal and the detection signal; generating a first integral signal specifying the integral value of the first reference signal over a predetermined number of revolution of the recording medium; generating a second reference signal specifying the product of the cosine wave signal and the detection signal; generating a second integral signal specifying the integral value of the second reference signal over a predetermined number of revolution of the recording medium; generating a comparative reference signal specifying the sum of the integral values of the first and second integral signals. The method of the type contributes to a reliable observation of the synchronous component in the detection signal.

A detecting apparatus of a specific type may be employed to realize the aforementioned method. The detecting apparatus may comprise: a function generating circuit designed to generate a wave signal of a trigonometric function synchronized with the rotation of the recording medium; a first multiplying circuit designed to multiply a detection signal from an acoustic emission sensor by a sine wave signal so as to generate a first reference signal; a first integration circuit designed to calculate the integral value of the first reference signal over a predetermined number of revolution of the recording medium; a second multiplying circuit designed to multiply a detection signal from the acoustic emission sensor by a cosine wave signal so as to generate a second reference signal; a second integration circuit designed to calculate the integral value of the second reference signal over a predetermined number of revolution of the recording medium; and an addition circuit designed to add the outputs from the first and second integration circuits to each other.

The detecting apparatus may further comprise: a spindle motor generating a driving force for the rotation of the recording medium; a flying slider opposed to the surface of the recording medium mounted on the rotation shaft of the spindle motor, said flying slider supporting the acoustic emission sensor; and a controlling circuit designed to control the rotation speed of the rotation shaft based on the position of the flying slider relative to the rotation shaft of the spindle motor. The AE sensor may be a piezoelectric element such as a PZT element in the aforementioned manner.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
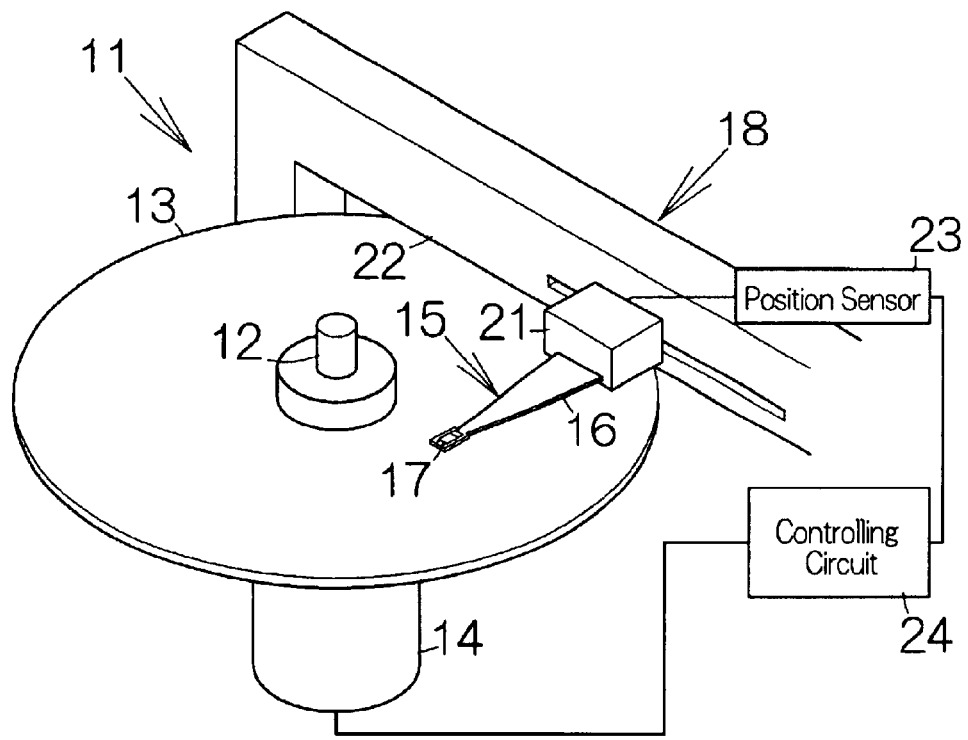
FIG. 1 is a perspective view schematically illustrating the structure of a detecting apparatus for a minute protrusion on a recording medium according to an embodiment of the present invention.

FIG. 1 schematically illustrate the structure of a detecting apparatus 11 for a minute protrusion on a recording medium according to an embodiment of the present invention. The detecting apparatus 11 includes a spindle motor 14 receiving a disk-shaped recording medium, namely, a magnetic recording disk 13 on a rotation shaft 12 extending in the vertical direction. The central axis of the magnetic recording disk 13 is aligned with the central axis of the rotation shaft 12. The spindle motor 14 serves to drive the magnetic recording disk 13 within a horizontal plane around the rotation shaft 12.

A sensor assembly 15 is related to the spindle motor 14. The sensor assembly 15 includes an elastic suspension 16 extending along the direction tangent to the circumferential direction of the magnetic recording disk 13. The elastic suspension 16 may be constructed in the same manner as a head suspension supporting a head slider in a hard disk drive (HDD), for example. A flying slider 17 is supported at the tip end of the elastic suspension 16. The flying slider 17 is opposed to the surface of the magnetic recording disk 13. The flying slider 17 is positioned right on a radial line of the magnetic recording disk 13.

The elastic suspension 16 is designed to urge the flying slider 17 toward the surface of the magnetic recording disk 13. When the magnetic recording disk 13 rotates, airflow is generated along the surface of the rotating magnetic recording disk 13. The airflow serves to generate a lift on the flying slider 17. The lift is balanced with the urging force from the elastic suspension 16 so that the flying slider 17 is allowed to fly above the surface of the rotating magnetic recording disk 13 at a relatively higher stability.

A displacement mechanism 18 is connected to the sensor assembly 15. The displacement mechanism 18 includes a support member 21 cantilevering the elastic suspension 16, and a guide rail 22 guiding a horizontal movement of the support member 21. A driving mechanism, not shown, may be employed to drive the support member 21. The driving mechanism may include a rack and a pinion, for example. In this case, the degree or amount of revolution of an electric motor, not shown, coupled to the pinion, can determine the amount of movement of the support member 21. When the support member 21 moves along the guide rail 22, the flying slider 17 is allowed to move in the horizontal direction right on a line penetrating through the central axis of the rotation shaft 12. When the magnetic recording disk 13 is mounted on the rotation shaft 12, the displacement mechanism 18 is allowed to establish the horizontal movement of the flying slider 17 along a radial line of the magnetic recording disk 13.

A position sensor 23 is related to the flying slider 17. The position sensor 23 is designed to detect the position of the flying slider 17 moving along the guide rail 22. Specifically, when the magnetic recording disk 13 is mounted on the rotation shaft 12, the position sensor 23 serves to obtain the position of the flying slider 17 in the radial direction of the magnetic recording disk 13. The position sensor 23 is designed to output a detection signal specifying the position of the flying slider 17 in the radial direction of the magnetic recording disk 13. Here, the position sensor 23 may detect the position of the flying slider 17 based on the position of the flying slider 17 itself or based on the motion of the displacement mechanism 18 generating the movement of the flying slider 17. Otherwise, any means or processes may be employed to detect the position of the flying slider 17.

A controlling circuit 24 is connected to the spindle motor 14. The controlling circuit 24 is designed to control the rotation speed of the rotation shaft 12. The controlling circuit 24 makes reference to the detection signal from the position sensor 23 when the controlling circuit 24 controls the rotation speed. Specifically, the controlling circuit 24 changes the rotation speed of the rotation shaft 12 in accordance with the position of the flying slider 17 in the radial direction of the magnetic recording disk 13. This action of the controlling circuit 24 serves to keep establishing a constant relative speed between the surface of the magnetic recording disk 13 and the flying slider 17 opposed to the surface of the magnetic recording disk 13. The controlling circuit 24 may comprise a microprocessor unit (MPU), a digital signal processing circuit (DSP), or the like, that operate based on a program stored in a memory, for example.

Figure 2:
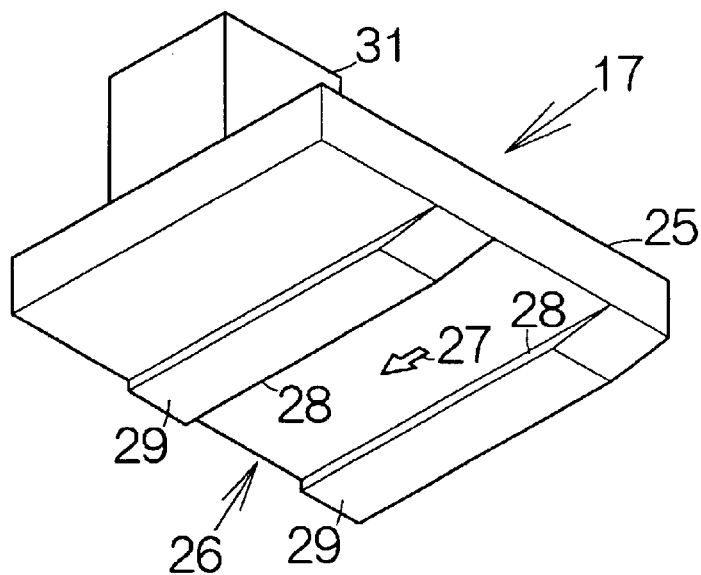
FIG. 2 is an enlarged perspective view of a flying slider.

FIG. 2 illustrates an example of the flying slider 17. The flying slider includes a slider body 25 of a flat parallelepiped, for example. The slider body 25 may be made of $Al_2O_3$-TiC, for example. A medium-opposed surface or bottom surface 26 is defined on the slider body 25. The bottom surface 26 of the slider body 25 is allowed to get opposed to the magnetic recording disk 13 at a distance. The bottom surface 26 of the slider body 25 receives airflow 27 generated along the rotating magnetic recording disk 13 in the aforementioned manner.

A pair of rails 28, 28 are defined on the bottom surface 26. The respective rails 28 are formed to extend from the inflow or leading end to the outflow or trailing end. The rails 28, 28 are designed to define air bearing surfaces 29, 29, respectively, on the top surfaces. The air bearing surfaces 29, 29 serves to generate the aforementioned lift in response to the action of the airflow 27. The magnitude of the generated lift should depend upon the relative speed between the magnetic recording disk 13 and the flying slider 17 as well as the direction of the airflow 27. The flying slider 17 is forced to move on the radial line of the magnetic recording disk 13 with a constant attitude or orientation relative to the radial line of the magnetic recording disk 13. Moreover, a constant relative speed is maintained between the flying slider 17 and the specific surface of the magnetic recording disk 13 right below the flying slider 17 in the aforementioned manner. Accordingly, the flying slider 17 is allowed to keep a constant flying height above the surface of the magnetic recording disk 13 irrespective of the position of the flying slider 17 in the radial direction of the magnetic recording disk 13.

A so-called acoustic emission (AE) sensor 31 is mounted on the flying slider 17. The AE sensor 31 may comprise a piezoelectric element such as a PZT (lead zirconate titanate) element, for example. The AE sensor 31 is designed to generate an electric signal based on sound, namely, an elastic wave. The magnitude of the voltage signal depends upon the magnitude of the sound or elastic wave.

Figure 3:
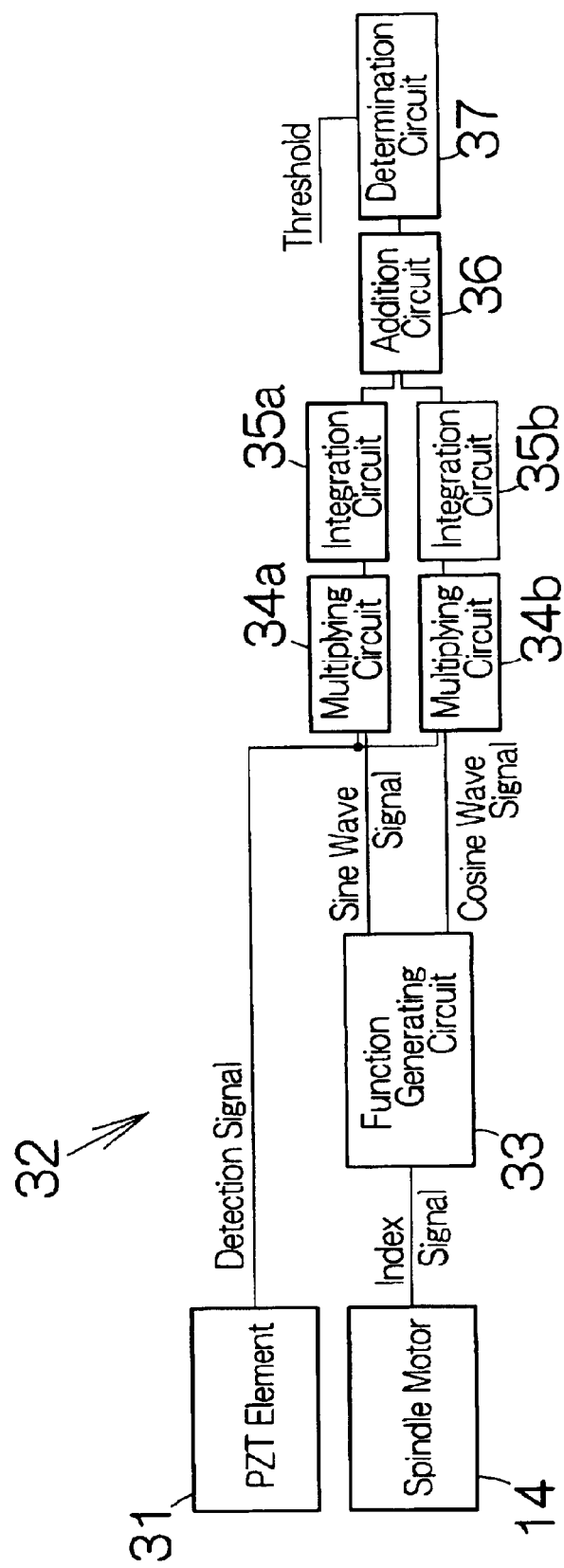
FIG. 3 is a block diagram schematically illustrating the structure of a signal processing circuit in the detecting apparatus.

As shown in FIG. 3, a signal processing circuit 32 is incorporated within the detecting apparatus 11. The signal processing circuit 32 includes a function generating circuit 33. The function generating circuit 33 is designed to generate a wave signal of a trigonometric function synchronized with the rotation of the magnetic recording disk 13. The function generating circuit 33 refers to an index signal of the spindle motor 14 when generating the wave signal of a trigonometric function. The index signal is output every time the magnetic recording disk 13 takes a turn from a standard attitude or angular position, for example. Here, sine and cosine wave signals are individually generated in the function generating circuit 33 based on the period of the index signal. A single period of sine or cosine wave in the sine or cosine wave signal may not correspond to a single turn of the magnetic recording disk 13. A single turn of the magnetic recording disk 13 may correspond to periods of the sine and cosine waves in the sine and cosine wave signals. The sine and cosine wave signals respectively correspond to angular position signals specifying the angle of rotation of the magnetic recording disk 13 from the standard attitude of the magnetic recording disk 13.

First and second multiplying circuit 34a, 34b are connected to the function generating circuit 33. The first multiplying circuit 34a is designed to multiply the detection signal from the AE sensor 31 by the sine wave signal. The second multiplying circuit 34b is likewise designed to multiply the detection signal from the AE sensor 31 by the cosine wave signal. The first and second multiplying circuit 34a, 34b may comprise a voltage controlled amplifier (VCA), for example. In this case, the first multiplying circuit 34a receives the sine wave signal at the signal input terminal and the detection signal at the control input terminal. In the same manner, the second multiplying circuit 34b receive the cosine wave signal at the signal input terminal and the detection signal at the control input terminal. The first multiplying circuit 34a outputs a voltage corresponding to the product of the detection signal and the sine wave signal. This voltage is referred to hereinafter as a first reference signal. The second multiplying circuit 34b outputs a voltage corresponding to the product of the detection signal and the cosine wave signal. This voltage is referred to hereinafter as a second reference signal.

First and second integration circuits 35a, 35b are individually connected to the first and second multiplying circuits 34a, 34b. The first and second integration circuits 35a, 35b are designed to calculate the integral values of the first and second reference signals, respectively. The first and second reference signals may be subjected to the integration over a predetermined number of revolution of the magnetic recording disk 13. Two or three turns may correspond to the predetermined number of revolution. The first integration circuit 35a outputs a first integration signal specifying the integral value of the first reference signal. The second integration circuit 35b likewise outputs a second integration signal specifying the integral value of the second reference signal.

An addition circuit 36 is commonly connected to the first and second integration circuits 35a, 35b. The addition circuit 36 is designed to add the first and second integration signals to each other. The addition circuit thus generates a comparative reference signal specifying the sum of the integral values of the first and second reference signals. A determination circuit 37 is connected to the addition circuit 36. The determination circuit 37 is designed to compare the comparative reference signal with a predetermined threshold. When the comparative reference signal exceeds the predetermined threshold, the determination circuit 37 determines the existence of a protrusion on the surface of the magnetic recording disk 13.

When the magnetic recording disk 13 is mounted on the rotation shaft 12 of the spindle motor 14, the controlling circuit 24 drives the rotation shaft 12 for rotation. The displacement mechanism 18 drives the flying slider 17 in the radial direction of the magnetic recording disk 13. The controlling circuit 24 controls the action of the spindle motor 14 in response to the movement of the flying slider 17. The controlling circuit 24 operates to maintain a constant relative speed between the magnetic recording disk 13 and the flying slider 17. The pitch of the movement of the flying slider 17 may be set to approximately a half of or one third the lateral width of the air bearing surface 29.

When the flying slider 17 collides against the magnetic recording disk 13 during the rotation of the magnetic recording disk 13, sound is generated. The AE sensor 31 serves to convert this sound of collision into an electric signal. A large variation of voltage appears in the detection signal of the AE sensor 31. The flying slider 17 is allowed to collide against the protrusion over a several turns of the magnetic recording disk 13. The variation appears in the detection signal of the AE sensor 31 at the specific angular position.

The AE sensor 31 often suffers from sound or elastic waves other then the sound of collision. This sound is introduced in the detection signal as noise. The variation of the voltage accordingly appears in the detection signal based on the sound other than the sound of collision.

The AE sensor 31 generates a detection signal based on all the sound or elastic waves. The detection signal is supplied to the first and second multiplying circuits 34a, 34b. The multiplying circuits 34a, 34b serve to amplify the sine and cosine wave signals based on the voltage of the detection signal. The obtained first and second reference signals are then subjected to the integration at the first and second integration circuits 35a, 35b. The integration serves to level the noise irregularly appearing in the detection signal or asynchronous with the rotation of the magnetic recording disk 13. Since the sound of collision is expected to be synchronized with the rotation of the magnetic recording disk 13, the variation of voltage corresponding to the sound of collision should remain in the integration signals.

In this manner, a variation corresponding to a sound of collision synchronous with the rotation of the magnetic recording disk 13 is reliably observed in the comparative reference signal output from the addition circuit 36. The determination circuit 37 determines the existence of a protrusion based on the comparative reference signal. Since the synchronous component with the rotation of the magnetic recording disk 13 is separated from the variation corresponding to noise, it is possible to determine the existence of a protrusion on the magnetic recording disk 13 at a higher accuracy.

The AE sensor 31 needs not be mounted on the flying slider 17 but on the elastic suspension 16 as well as the support member 21 in the aforementioned detecting apparatus 11. As long as the flying slider 17 is kept at a constant flying height above the magnetic recording disk 13, the relative speed may vary between the magnetic recording disk 13 and the flying slider 17.

What is claimed is:

1. A method of detecting a protrusion on a recording medium, comprising:

obtaining an index signal specifying a standard attitude of the recording medium;

generating a sine wave signal based on a period of the index signal, the sine wave signal specifying an angle of rotation of the recording medium from the standard attitude of the recording medium;

obtaining a detection signal output from a collision detector designed to detect a collision between a surface of the recording medium and a flying slider; and determining a collision between the surface of the recording medium and the flying slider based on the sine wave signal and the detection signal.

2. The method of detecting according to claim 1, wherein a constant relative speed is set between the surface of the recording medium and the flying slider during the rotation of the recording medium.

3. The method of detecting according to claim 2, wherein said collision detector is designed to detect a sound induced based on a collision between the surface of the recording medium and the flying slider.

4. The method of detecting according to claim 3, wherein said collision detector is an acoustic emission sensor mounted on the flying slider.

5. The method of detecting according to claim 4, wherein said acoustic emission sensor is a piezoelectric element.

6. The method of detecting according to claim 1, further comprising:

generating a cosine wave signal based on a period of the index signal, the cosine wave signal specifying the angle of rotation of the recording medium from the standard attitude of the recording medium, wherein the collision is determined based on the sine wave signal, the cosine wave signal and the detection signal.

7. The method of detecting according to claim 6, further comprising:

generating a first reference signal specifying a product of the sine wave signal and the detection signal;

generating a first integral signal specifying an integral value of the first reference signal over a predetermined number of revolution of the recording medium;

generating a second reference signal specifying a product of the cosine wave signal and the detection signal;

generating a second integral signal specifying an integral value of the second reference signal over a predetermined number of revolution of the recording medium; and generating a comparative reference signal specifying a sum of the integral values of the first and second integral signals, wherein the collision is determined based on the comparative reference signal.

8. The method of detecting according to claim 7, wherein a constant relative speed is set between the surface of the recording medium and the flying slider during the rotation of the recording medium.

9. The method of detecting according to claim 8, wherein said collision detector is designed to detect a sound induced based on a collision between the surface of the recording medium and the flying slider.

10. The method of detecting according to claim 9, wherein said collision detector is an acoustic emission sensor mounted on the flying slider.

11. The method of detecting according to claim 10, wherein said acoustic emission sensor is a piezoelectric element.

12. A detecting apparatus for a protrusion on a recording medium, comprising:

a function generating circuit designed to generate a sine wave signal and a cosine wave signal based on rotation of the recording medium;

a first multiplying circuit designed to multiply a detection signal from an acoustic emission sensor by the sine wave signal so as to generate a first reference signal, the detection signal designating an elastic wave between a target object and a surface of the recording medium;

a first integration circuit designed to calculate an integral value of the first reference signal over a predetermined number of revolution of the recording medium;

a second multiplying circuit designed to multiply a detection signal from the acoustic emission sensor by the cosine wave signal so as to generate a second reference signal;

a second integration circuit designed to calculate an integral value of the second reference signal over a predetermined number of revolution of the recording medium; and an addition circuit designed to add outputs from the first and second integration circuits to each other.

13. The detecting apparatus according to claim 12, wherein said acoustic emission sensor is a piezoelectric element.

14. The detecting apparatus according to claim 13, wherein said piezoelectric element is a PZT element.

15. The detecting apparatus according to claim 12, comprising:

a spindle motor generating a driving force for the rotation of the recording medium;

a flying slider opposed to a surface of the recording medium mounted on a rotation shaft of the spindle motor, said flying slider supporting the acoustic emission sensor; and a controlling circuit designed to control rotation speed of the rotation shaft based on position of the flying slider relative to the rotation shaft of the spindle motor.

16. The detecting apparatus according to claim 15, wherein said acoustic emission sensor is a piezoelectric element.

17. The detecting apparatus according to claim 16, wherein said piezoelectric element is a PZT element.

* * * * *